United States Patent Office 3,325,518
Patented June 13, 1967

3,325,518
16-ALKYL PREGNANE DERIVATIVES AND PROCESS FOR THE PREPARATION THEREOF
Colin Leslie Hewett and Gilbert Frederick Woods, Glasgow, Scotland, assignors to Organon Inc., West Orange, N.J., a corporation of New Jersey
No Drawing. Filed Oct. 15, 1964, Ser. No. 404,174
Claims priority, application Great Britain, Oct. 28, 1963, 42,374/63; Apr. 17, 1964, 16,041/64; Sept. 10, 1964, 37,064/64
4 Claims. (Cl. 260—397.4)

This invention relates to novel biologically active compounds of the pregnane series and to processes for the preparation thereof.

More particularly, the invention relates to the preparation of a group of new 16α-alkyl-steroids of the pregnane series having the formula:

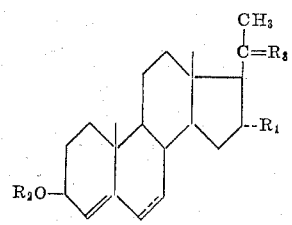

wherein $R_1$=an alkyl group having 1–4 carbon atoms,
$R_2$=hydrogen or an acyl radical,
$R_3$=a keto group, H(OH) or H(OAcyl), and
$C_6$–$C_7$=saturated or unsaturated.

The alkyl group in 16-position is a saturated aliphatic hydrocarbon radical having 1 to 4 carbon atoms, e.g. a methyl, ethyl, propyl, isopropyl or butyl radical.

The compounds according to the invention are of great importance on account of their progestational, particularly long-acting progestational activity, ovulation-inhibiting and pregnancy-maintaining properties.

The above compounds may be prepared from the corresponding $\Delta^4$-3-keto-16α-alkyl-compounds of the pregnane series having in the 20-position a keto, hydroxyl or acyloxy group and wherein the bond between the carbon atoms 6 and 7 may be saturated or unsaturated by reduction of the 3-keto group, if desired, together with the 20-keto group, after which the thus obtained compounds may be esterified in the 3- and/or 20-position.

As reducing agent may be used an alkalimetal aluminium hydride, e.g. lithium aluminium hydride, an alkalimetal borohydride, e.g., potassium borohydride and sodium borohydride, an alkalimetal trialkoxy aluminium hydride, e.g., lithium trimethoxy aluminium hydride, sodium triethoxy aluminium hydride and lithium tri-t-butoxy aluminium hydride, an alkalimetal trialkoxy borohydride, e.g., sodium trimethoxy borohydride, and further with aluminium alkoxydes, e.g., aluminium isopropoxyde.

Starting from a $\Delta^4$-, or $\Delta^{4,6}$-3,20-diketo-compound the 20-keto group may be reduced together with the 3-keto group but it is also possible to reduce only the 3-keto group either by selective reduction of this group or by protection of the 20-keto group.

The selective reduction takes place if the reduction is performed with an alkalimetal borohydride in the presence of a suitable organic solvent, for example, tetrahydrofuran or isopropanol. In that case it is desirable to perform the reduction with only a small excess of the borohydride used, usually 1.1 to 1.5 equivalents.

Alternatively, the 20-keto group may be protected temporarily, e.g. by ketalisation for example as the ethylenedioxy ketal and regeneration of this group by treatment with an acid after the reduction step.

The $\Delta^{4,6}$-3-hydroxy or acyloxy-pregnadiene compounds according to the invention may be prepared also by bromination of the corresponding $\Delta^5$-3β-acyloxy- or 3β-hydroxy compound followed by dehydrobromination to obtain the corresponding $\Delta^{4,6}$-3-acyloxy- or 3-hydroxy steroid.

The thus obtained $\Delta^4$-3β-hydroxy-16α-alkyl compounds having in 20-position a keto group or a 20α- or 20β-hydroxyl group may be esterified in the 3 and/or 20-position.

The esterification of the 3β-hydroxyl group and the 20α or 20β-hydroxyl groups may be performed with an inorganic acid such as phosphoric acid, or sulphuric acid, or an aliphatic, aromatic or araliphatic carboxylic acid, preferably with 1–18 carbon atoms, such as acetic acid, propionic acid, butyric acid, trimethyl acetic acid, valeric acid, caproic acid, oenanthic acid, caprylic acid, capric acid, lauric acid, undecylic acid, oleic acid, linolenic acid, palmitic acid, succinic acid, cyclopentyl acetic acid, β-phenylpropionic acid, cyclohexyl butyric acid and tartaric acid.

3β-monoesters may be prepared by esterification of the 3β-hydroxy-20-ketone, after which the 20-keto group may be reduced with a suitable reducing agent such as described before.

20-monoesters can be prepared by suitable alkalimetal borohydride or aluminium hydride reduction of the corresponding esters of the respective 3-keto-16α-alkyl-20-hydroxy compounds. By further esterification of these 3-, and 20-monoesters using a different acid or a functional derivative thereof mixed diesters are obtained.

The process is illustrated by the following examples.

EXAMPLE I

A solution of 16α-ethyl pregnenolone acetate (30 g.) in benzene (1050 cc.) was treated with ethylene glycol (85 cc.) and 2,4-dinitrobenzenesulphonic acid (1 g.) and the solution refluxed vigorously for 65 hours, collecting the water formed in a Dean and Stark separator. The cooled reaction mixture was then treated with excess solid potassium carbonate and diluted with ether and water. The organic layer was washed repeatedly with water until neutral, dried over sodium sulphate and evaporated to dryness. Two crystallisations of the residue from methanol containing a trace of pyridine gave 16α-ethyl-3β-acetoxy-pregn-5-en-20-one-ethylene-dioxyketal (16.5 g.).

The 3β-acetoxy-pregn-5-en-20-one 20-ethylenedioxyketal (13 g.) was dissolved in a 0.3 N solution of potassium carbonate in 99.5% methanol (130 cc.) and refluxed for 20 minutes. Addition of water to the cooled solution gave 16α-ethyl-pregn-5-en-3β-ol-20-one 20-ethylenedioxyketal (11.5 g.).

16α - ethyl - pregn - 5 - en - 3β - ol - 20 - one 20 - ethylenedioxyketal (18 g.) was dissolved in toluene (180 cc.) and cyclohexanone (90 cc.) and the solution slowly distilled until free from water. The hot solution was then treated with a solution of aluminium isopropoxide (10 g.) in toluene (20 cc.), added over five minutes, and then heated to boiling with slow distillation for 30 minutes. The cooled solution was treated with a solution of Rochelle salt (30 g.) in water and then steam distilled until free from steam volatile products. The crude solid was filtered, washed thoroughly with water and dried. Crystallisation from methanol containing a trace of pyridine gave 16α-ethyl-pregn-4-ene-3,20-dione 20-ethylenedioxyketal (12.5 g.).

16α - ethyl - pregn - 4 - en - 3,20 - dione 20 - ethylenedioxyketal (6.35 g.) was suspended in methanol (190 cc.) containing a few drops of pyridine. Sodium borohydride (1.5 g.) was then added gradually over 1 hour with stirring at 20° C. and solution was complete in about 10 minutes. The solution was stirred for a further 2 hours at 20° C. and careful addition of water gave 16α-ethyl-pregn-4-en-3β-ol-20-one 20-ethylenedioxyketal (6.35 g.) which could be crystallised from methanol. The acetate was prepared by reaction with acetic anhydride in pyridine overnight at 20° C.

16α-ethyl-pregn - 4 - en - 3β - ol-20-one 20-ethylenedioxyketal (12 g.) was dissolved in acetic acid (300 cc.) and the solution cooled to 25–30° C. Careful addition of water, dropwise at first, over 15 minutes and finally complete watering out gave a gum which was extracted with ether and the ether solution washed to neutrality with sodium carbonate solution and finally water. Evaporation of the dried extract gave an oil which crystallised from hexane/acetone to give 16α-ethyl-pregn-4-en-3β-ol-20-one (7.5 g.).

The 3β-acetate was prepared by reaction with acetic anhydride in pyridine overnight at 20° C.

The 3β-hemisuccinate was prepared by dissolving the hydroxy compound (2 g.) and recrystallised succinic anhydride (2.9 g.) in pyridine (20 cc.) and allowing the solution to stand at 20° C. for 19 days. The solution was then poured on to ice and acidified with 2 N HCl. The filtered, washed and dried product was crystallised from ether/hexane to give the 3β-hemisuccinate (2.09 g.).

In an analogous manner the corresponding 3-esters derived from isocaproic acid, oenanthic acid, β-phenyl propionic acid and lauric acid were prepared.

EXAMPLE II

16α - isopropyl - pregn - 4 - en - 20β - ol - 3 - one (2.6 g.) was dissolved in pyridine (10 cc.) and the solution treated with propionic anhydride (5 cc.). After standing at 20° C. for 18 hours ice was added and the solid filtered, washed and dried to give the 20β-propionate (2.8 g.) which could be crystallised from methanol. The finely divided propionate (2.5 g.) was added to cold methanol (100 cc.) and the stirred suspension treated with sodium borohydride (650 mg.) added gradually over 1 hour. Solution was complete in about 30 minutes, and stirring was continued for a total of 3 hours, after which excess reagent was decomposed by careful addition of acetic acid (5 cc.). Excess water was then added and the solid filtered, washed and dried and crystallised from methanol to give 16α-isopropyl-pregn-4-ene-3β,20β-diol 20β-propionate (2.1 g.). Acetylation overnight in pyridine/acetic anhydride and crystallisation of the watered out product from methanol gave 16α-isopropyl-pregn-4-ene-3β,20β-diol 3β-acetate 20β-propionate.

In the same manner the corresponding 3β-acetate-20β-oenanthate, and 3β-propionate-20β-decanoate were prepared.

EXAMPLE III

16α-methyl-pregn-4-en-3β-ol-20-one (10 g.) prepared in the manner as described in Example I was dissolved in pyridine and treated with propionic anhydride in the usual way and the product crystallised from methanol to give the 3β-propionate (10 g.). The propionate (10 g.) was dissolved in methanol (400 cc.) and the cooled solution was stirred and treated portionwise with sodium borohydride (3.5 g.) keeping the temperature below 20° C. After stirring for a total of 3 hours, excess borohydride was decomposed by careful addition of acetic acid (15 cc.) and the product isolated in the usual way by addition of excess water. Several crystallisations from aqueous methanol gave 16α-methyl-pregn-4-ene-3β,20β-diol 3β-propionate (6 g.). Acetylation in pyridine/acetic anhydride at 20° C. for 16 hours and crystallisation of the product from methanol gave 16α-methyl-pregn-4-en-3β,20β-diol 3β-propionate 20β-acetate.

In the same way 16α-methyl-pregn-4-en-3β,20β-diol-3β-phenyl propionate 20β-valerate was prepared.

EXAMPLE IV

A solution of 16α-ethyl progesterone (20 g.; 0.0584 mole) in tetrahydrofuran (100 cc.) was slowly stirred with a suspension of sodium borohydride (825 mg.; 0.0218 mole), at 18–20° C. and the ultraviolet absorption of the reaction mixture was examined at intervals. After 48 hours the ultraviolet absorption showed complete reduction of the 3-ketone and the solution was cooled to 10° C. and excess borohydride decomposed by dropwise addition of acetic acid (5 cc.). Careful addition of water gave a solid which was filtered, dried and crystallized from hexane/acetone to give 16α-ethyl pregn-4-en-3β-ol-20-one (12.5 g.) containing approximately 10% of 16α-ethyl-5α-pregnan-3β-ol-20-one. This mixture was purified by acetylation in acetic anhydride/pyridine overnight at 20° C. and the acetylated product was crystallised from ether/hexane to give 16α-ethyl pregn-4-ene-3β-ol-20-one acetate (9 g.). The acetate was hydrolised in aqueous methanolic potassium carbonate to give 16α-ethyl pregn-4-en-3β-ol-20-one (7.6 g.).

EXAMPLE V

A solution of 16α-ethyl progesterone (1 g.) in tetrahydrofuran (8 cc.) was treated with sodium borohydride (42 mg.) and the solution refluxed gently until the ultraviolet absorption of the solution showed that all the 3-ketone had been reduced. After 3 hours' reflux the solution was cooled to 10–15° C. and excess borohydride decomposed with acetic acid. Careful addition of water gave a solid (1 g.) which was purified via the acetate as described in Example IV to give 16α-ethyl pregn-4-ene-3β-ol-20-one (380 mg.).

EXAMPLE VI

16α-butyl progesterone (1.05 g.) in isopropanol (25 cc.) was treated with sodium borohyride (42 mg.) and the solution allowed to stand at 18–20° C. for 23 hours, by which time the ultraviolet absorption of the solution showed that all the 3-ketone had been reduced. The cooled solution was then treated with acetic acid (0.5 cc.) and careful addition of water gave a tacky solid which was prified via the acetate as described in Example IV to give 16α-butyl pregn-4-en-3β-ol-20-one (369 mg.).

EXAMPLE VII 1.63 g. of 16α-isopropyl pregna-4,6-diene-3,20-dione was added to a solution of lithium tri-t-butoxy aluminum hydride (600 mg.; 1.2 mole equivalents) in tetrahydrofuran (25 cc.). The solution was kept at 5° C. until the ultraviolet absorption of the reaction mixture showed that the 3-ketone was completely reduced. After 50 hours excess reagent was decomposed by careful addition of acetone and addition of water then gave a precipitate of crude product which was collected by filtration. Several recrystallisations from ether/hexane gave 16α-isopropyl pregna-4,6-diene-3β-ol-20-one (850 mg.). Acetylation of this compound with acetic anhydride in pyridine yielded the corresponding 3-acetate.

In the same manner a number of other 3-esters were prepared derived from valeric acid, oenanthic acid, β-phenyl propionic acid and succinic acid.

EXAMPLE VIII

A solution of 16α-ethyl pregna-4,6-diene-3,20-dione (5 g.) in tetrahydrofuran (30 cc.) was slowly stirred with a suspension of sodium borohydride (230 mg.) at 18–20° C. until after 40 hours, the ultraviolet absorption of the reaction mixture showed that the 3-ketone was completely reduced. The solution was cooled to 10° C. and excess borohydride was decomposed by the addition of acetone. Careful addition of water gave a solid which was filtered, washed and dried and acetylated in pyridine (15 cc.) acetic anhydride (7.5 cc.). The product crystallised from ether/hexane to give 16α-ethyl pregn-4,6-diene-3β-ol-20-one acetate (2.15 g.). The acetate was hydrolysed in aqueous methanolic potassium carbonate to give 16α-ethyl pregna - 4,6 - diene - 3β - ol - 20 - one (1.7 g.); $\lambda_{max}$, 233 ($\epsilon=24{,}100$), 239 ($\epsilon=26{,}950$), 248 ($\epsilon=18{,}000$).

EXAMPLE IX

In a manner similar to Example VIII, 16α-ethyl pregna-4,6-dien-3-one-20β-ol 20-acetate was reduced to 16α-ethyl pregna-4,6-diene-3β-20β-diol 20-acetate. The diacetate of the crude product was recrystallized from ether/hexane and after hydrolysis yielded pure 16α-ethyl pregna-4,6-diene-3β,20β-diol.

EXAMPLE X

16α-ethyl pregnenolone acetate (10 g.) in petroleum ether, B.P. 60–80° C. (100 ml.), was treated with collidine (2 ml.) followed by N-bromosuccinimide (5.26 g.; 1.14 mole equivalents) and refluxed for 30 minutes in a flask protected from light. Filtration of the hot mixture and exaporation under reduced pressure gave a gel which was treated with boiling collidine (50 ml.) and refluxed for 20 minutes. On cooling, ether (500 ml.) was added and the resulting solution washed six times with 5 N hydrochloric acid (50 ml.), then washed with water and dried over sodium sulphate. The ether solution was poured through a short column of alumina and the column eluted with a further 500 ml. ether. Evaporation of the ether gave 16α-ethyl pregna-4,6-diene-3β-ol-20-one acetate which was dissolved in a saturated solution of potassium carbonate in methanol (100 ml.) and left overnight at room temperature. Careful addition of water and crystallisation of the product from acetone gave 16α-ethyl pregna-4,6-diene-3β-ol-20-one (0.78 g.), $\lambda_{max}$· 233 ($\epsilon$=23,400), 239 ($\epsilon$=26,350), 248 ($\epsilon$=17,100).

In the way as described in Example I this compound was converted into the corresponding 3-esters derived from valeric acid, capric acid, succinic acid and β-phenyl propionic acid.

We claim:
1. A steroid compound of the formula:

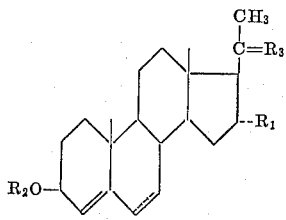

wherein
  $R_1$ is saturated hydrocarbon having 1–4 carbon atoms,
  $R_2$ is selected from the group consisting of hydrogen and acyl derived from a member of the group consisting of an inorganic acid and an organic acid having 1 to 18 carbon atoms,
  $R_3$ is selected from the group consisting of a keto group, H(OH) and H(OAcyl) wherein acyl is derived from a member of the group consisting of an inorganic acid and an organic acid having 1 to 18 carbon atoms, and
  $C_6$–$C_7$ is selected from the group consisting of a saturated and unsaturated bond, and when $C_6$–$C_7$ is an unsauturated bond and $R_3$ is selected from the group consisting of H(OH) and H(OAcyl), $R_1$ is ethyl, and when $C_6$–$C_7$ is a saturated bond and $R_3$ is a keto group, $R_1$ is also ethyl.

2. A compound selected from the group consisting of $\Delta^4$-3β-hydroxy-16α-ethyl-20-keto-pregnene and the corresponding 3-acylates, the acyl of which is derived from a member of the group consisting of an inorganic acid and an organic acid having 1 to 18 carbon atoms.

3. A compound selected from the group consisting of a $\Delta^{4,6}$-3β-hydroxy-16α-lower alkyl-20-keto-pregnadiene and the corresponding 3-acylates, the acyl of which is derived from a member of the group consisting of an inorganic acid and an organic acid having 1 to 18 carbon atoms.

4. A compound selected from the group consisting of $\Delta^{4,6}$ - 3β - hydroxy-16α-ethyl-20-keto-pregnadiene and the corresponding 3-acylates, the acyl of which is derived from a member of the group consisting of an inorganic acid and an organic acid having 1 to 18 carbon atoms.

References Cited

UNITED STATES PATENTS
3,061,606  10/1962  Gut et al. _____ 260—239.55

OTHER REFERENCES
Marker et al.: Journal American Chem. Soc., vol. 64 (1942), pages 1280–1281 relied on.
"Methods in Hormone Research," vol. II (1962), pages 148–149 relied on. Academic Press Inc., New York.

ELBERT L. ROBERTS, *Primary Examiner.*
LEWIS GOTTS, *Assistant Examiner.*